(12) United States Patent
Ohkawa

(10) Patent No.: US 6,676,268 B2
(45) Date of Patent: Jan. 13, 2004

(54) LIGHT GUIDE PLATE, SURFACE LIGHT SOURCE DEVICE AND DISPLAY

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/781,967

(22) Filed: Feb. 14, 2001

(65) Prior Publication Data

US 2002/0044436 A1 Apr. 18, 2002

(30) Foreign Application Priority Data

Feb. 18, 2000 (JP) ........................................ 2000-040469

(51) Int. Cl.$^7$ ................................................. F21V 7/04
(52) U.S. Cl. ........................... 362/31; 362/31; 362/330; 362/339; 362/26; 362/558; 362/561; 349/62; 349/65
(58) Field of Search ........................... 362/31, 330, 339, 362/558, 561, 26; 349/62, 65

(56) References Cited

U.S. PATENT DOCUMENTS 6,036,327 A * 3/2000 Blonder et al. ................ 362/31
6,384,881 B1 * 5/2002 Arai et al. ..................... 349/61

FOREIGN PATENT DOCUMENTS

| CN | 284853 | 9/1996 |
|----|--------|--------|
| CN | 324791 | 1/1998 |

* cited by examiner

Primary Examiner—Stephen Husar
Assistant Examiner—Bertrand Zeade

(57) ABSTRACT

A display has a liquid crystal display panel illuminated by a surface light source device. The surface light source device comprises a primary light source provided with a plurality of point-like light emitters and a light guide plate which is supplied with light by the primary light, the light being introduced in the light guide plate through an incidence face and being emitted through an emission face. The incidence face is located at a corner portion of the light guide plate. A great number of projections for light-advancing-direction-conversion are formed on a back face. Each of the projections includes a pair of slopes formed so as to provide a ridge approaching the back face with an increasing distance from the incidence face. The pairs of slopes form valleys in the light guide plate, the valleys being orientated to be opened toward the corner portion corresponding to the incidence face. Each projection is shaped like, for instance, a quadrangle pyramid. A radial light propagation within the light guide plate starts from the corner portion and gives light which enters the valleys provided by the projections and is subject to direction-conversion toward the emission face. Emission is supplied to the liquid crystal display panel.

9 Claims, 11 Drawing Sheets

Fig.10
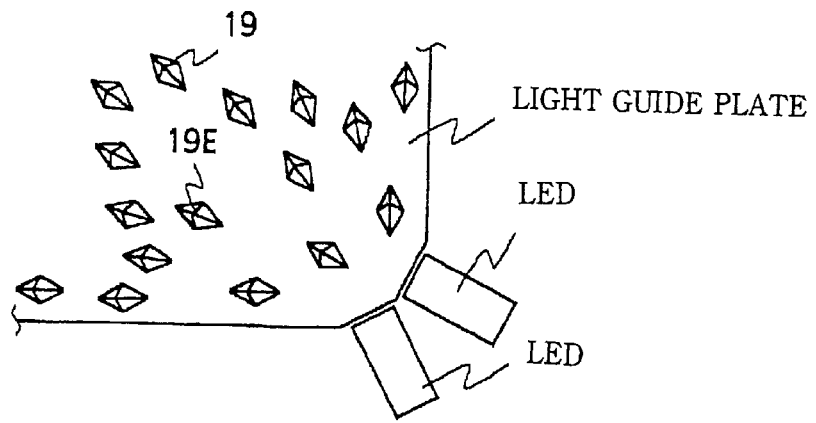
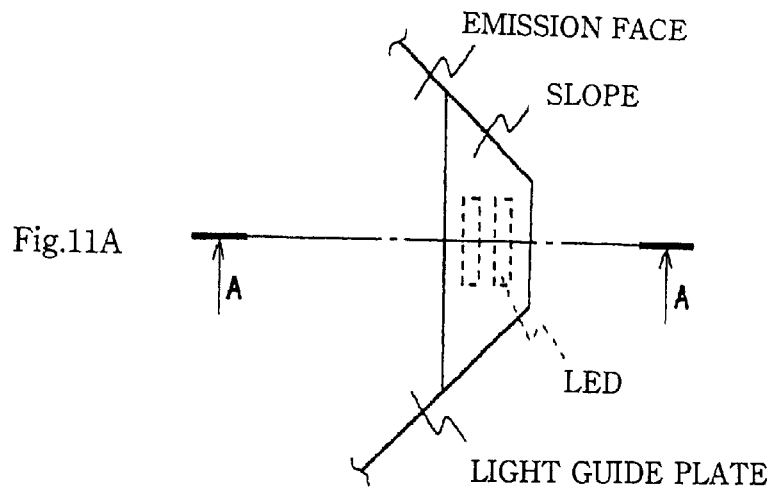
Fig.11A
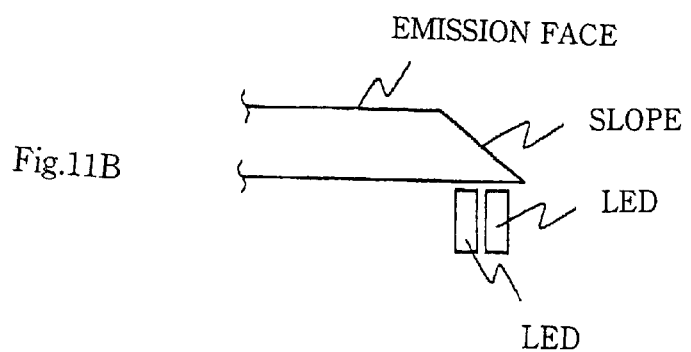
Fig.11B

LIGHT GUIDE PLATE, SURFACE LIGHT SOURCE DEVICE AND DISPLAY

BACKGROUND

1. Field of Invention

The present invention relates to a light guide plate, a surface light source device and a display, in particular, a light guide plate having a corner portion from which light is inputted, a surface light source device employing the light guide plate and a display having a liquid crystal display panel illuminated by the surface light source device. The invention is applied, for example, to a liquid crystal display incorporated in a portable phone, and to a surface light source device and light guide plate employed in the display.

2. Related Arts

It is well known to employ a surface light source device to illuminate a liquid crystal display panel in a liquid crystal display. In general, a surface light source device comprises a light guide plate and a primary light source to supply primary light to the plate. Although rod-like fluorescent lamps (cold cathode tubes) have been broadly adopted as primary light sources, a recent tendency is that alternative ones using a point-like light emitter such as light emitting diode (called LED hereafter) are growingly employed.

In particular, the above tendency is being predominant in cases where a liquid crystal display has a comparatively narrow display screen incorporated in a comparatively small appliance such as portable phone.

With such a surface light source device, light is introduced into a light guide plate, then being emitted gradually from an emission face on the way of propagation within the plate. That is, such an inside propagation gives light chances of inner incidence to the emission face, with the result that some of the inner-incident light overcomes the critical angle condition to escape out of the light guide plate through the emission face, hereby providing an emission output. But some problems arise as follows.

(1) A very small part of the light can really overcome the critical angle condition. Accordingly, a low emission efficiency is realized.

(2) As well known, a main direction of emission is greatly inclined with respect to a frontal direction of an emission face. This makes it difficult to supply an object to be illuminated, such as liquid crystal display panel, with light from a generally vertical direction.

(3) An point-like light emitter employed, the light emitter brings a divergent property in addition to so-called "oblique emission directionality" as above (2), resulting in an inefficient illumination. It hardly gives a display, if applied to the display, a clear display screen.

According to a known technique for solving such problems, a light scattering pattern is formed on an emission face. In some cases, a light scattering pattern is formed on a back face. Such a light scattering pattern, which consists of a great number of fine light scattering elements formed according to a predetermined distribution, promotes emission from an emission face to relax above problem (1). In addition to this, a light scattering effect reduces the directionality of emission, thereby relaxing above problems (2) and (3).

However, such a technique relying on a light scattering pattern is not capable of directing an emission positively to a desired direction (usually, a roughly frontal direction), although it is able to weaken the directionality through a light scattering effect.

Although other prior arts include a method, according to which an emission face or back face is roughened overall, and another method, according to which a light diffusion sheet is arranged additionally along an emission face, such methods are also hardly expected to be capable of directing an emission positively to a desired direction (usually, a roughly frontal direction) because they depend on causing propagation directions of emission to be diversified in order to overcome the problems.

Although a well known prism sheet has a function of directing an emission positively to a desired direction, such an additional sheet, if employed and disposed, will lead to an increased number of components and accordingly to an increased manufacturing cost. Beside, if applied, in particular, to a small size appliance such as portable phone, it brings a disadvantage because a total thickness of the appliance will be increased.

The present inventor proposed a technique according to which a great number of projection-shaped micro-reflectors are formed on a back face of a light guide plate to overcome the above-described situation (U.S. patent application Ser. Nos. 09/647,760; WO 00/49432).

The propose is briefly describe with reference to FIGS. 14 and 15. FIG. 14 shows one of projections which are formed on a back face of light guide plate. FIG. 15 exemplarily shows a distribution of the projections on the back face of the light guide plate and an arrangement of a primary light source.

As illustrated in FIG. 14, each of the projections is shaped as to project from a general plane of the back face (i.e. a plane representative of the back face except for the projections). Each projection comprises a first reflection face (slope) and second reflection face (slope), a pair of these reflection faces forming a valley inside.

An inside propagating light entering into a valley formed by any projection, most of the light is inner-reflected by one and the other of a pair of the reflection faces in succession to be directed toward an emission face. Since an inner-incidence angel to the emission face can be controlled through directions of the two reflection faces, an emission to, for example, a generally frontal direction is realized with ease. This function of micro-reflectors depends on no light diverging effect (neither scattering nor diffusing). There is no need to arrange a prism sheet.

And, it is allowed to adopt a line-like light source such as cold cathode tube or point-like one such as LED optionally as a primary light source. An arrangement in which the latter is adopted is illustrated in FIG. 15. Referring to the arrangement, LEDs are disposed at two positions along one side of a light guide plate and projections are laid out correlatively with the LEDs.

Viewing from small-sizing of device or saving of electric power, it is preferable to adopt a LED as a primary light source. And controlling of light supply quantity is easily achieved by, for example, employing a drive circuit designed as to be capable of optional lighting. It will be growingly expected and desired in the future that the arrangement as shown in FIG. 15 is applied to displays for various portable information appliances such as portable phones.

Under such a situation, the present inventor has been studying on arrangements employing a plurality of LEDs as shown in FIG. 15 and has come to understandings as follows.

An arrangement as shown in FIG. 15 suffers from a problem that an projection array determined as to be optimum for one LED is far from being optimum for the other LED because a plurality of LEDs are disposed along a side away from each other. In other words, it is hardly possible to determine an projection array as to be optimum for every LED for direction-converting light emitted from every LED effectively to a desired direction effectively.

Another problem, which can arise in some cases, is that projections fitting for one LED can disturb an inside propagation or direction conversion of light emitted from the other LED. Such a situation apparently leads to a conclusion that arrangements like one shown in FIG. 15 should be improved, viewing from an expectation that demand for a high efficiency of light utilization and a uniform brightness on an emission face will be more severe in the near future.

That is, if a plurality of point-like light emitters are combined with a light guide plate provided with micro-reflectors as above-proposed, a newly structured surface light source device and a novel light guide plate employed in the device fitting thereto are desired.

OBJECT AND SUMMARY OF INVENTION

An object of the present invention is to provide a light guide plate improved as to satisfy the above-mentioned demand, a surface light source device improved by making use of the light guide plate and a display improved by making use of the surface light source device.

Saying concretely, the present invention provides a light guide plate comprising a micro-reflector disposal which can be fit for a plurality of point-like light emitters, a surface light source device which employs the light guide plate suitably in combination with point-like light emitters and a display which employs the surface light source device for illuminating a liquid crystal display panel.

First, the present invention is applied to a light guide plate to be supplied with light from a primary light source having a point-like light emitter, wherein the light guide plate comprises an emission face for light output, a back face opposite with the emission face and an incidence face for light input.

According to the present invention, the incidence face is located at a corner portion of the light guide plate and the back face is provided with a great number of projections for light-advancing-direction-conversion.

Each of the projections includes a pair of slopes formed so as to provide a ridge approaching the back face with an increasing distance from the incidence face. And pairs of slopes provide valleys in the light guide plate, the valleys being orientated to be opened toward the corner portion. In a typical case, the projections are configured like quadrangle pyramids.

Such a construction is suitable for a light guide plate having an incidence face supplied with light from a plurality of point-like light emitters. That is, if a plurality of point-like light emitters are combined with the light guide plate, no great difference arises among light supply paths of the respective point-like light emitters because the incidence face is located at a corner portion. This contrasts apparently with the arrangement shown in FIG. 15. In the case of the arrangement shown in FIG. 15, the incidence faces located at two locations distant from each other cause the corresponding LEDs to produce light paths which are greatly different from each other. The present invention is able to avoids such a situation.

Accordingly, the micro-reflectors, which are orientated as to be opened toward the corner portion as mentioned above, a plurality of point-like light emits supply light which is effectively direction-converted by the micro-reflectors, thereby realizing an emission positively directed to a desired direction.

In the next place, the present invention is applied to a surface light source device comprising a primary light source having a point-like light emitter and a light guide plate supplied with light from the primary light source, the light being introduced into the light guide plate through an incidence face and being emitted through an emission face.

According to the present invention, the incidence face is located at a corner portion of the light guide plate and the back face is provided with a great number of projections for light-advancing-direction-conversion.

Each of the projections includes a pair of slopes formed so as to provide a ridge approaching the back face with an increasing distance from the incidence face. And pairs of slopes provide valleys in the light guide plate, the valleys being orientated to be opened toward the corner portion. In a typical case, the projections are configured like quadrangle pyramids.

Such a construction causes the disposed plurality of point-like light emitters to supply light which is introduced into the light guide plate through the incidence face located at the corner along light paths similar to each other and then is direction-converted effectively by the micro-reflectors, thereby realizing an emission positively directed to a desired direction. It is noted that directions toward which valleys of the micro-reflectors are opened only need to be directed substantially to the corner.

That is, the respective valleys orientated as to be opened toward the corner portion cause the plurality of point-like light emitters disposed to produce light which approach the micro-reflectors from the corner portion and is guided to the valleys very smoothly no matter which emitter is origin of the guided light. Needless to say, such an advantage is not expected in the arrangement as shown in FIG. 15.

A display in accordance with the present invention is obtained by disposing the surface light source device improved as above for illuminating a liquid crystal display panel. The display inherits the above advantage of the surface light source device. That is, the liquid crystal display panel is illuminated effectively from a desired direction, providing a clear display screen.

BRIEF DESCRIPTION OF DRAWINGS

FIG. 10 is a plan view to illustrate a part around an incidence face of a light guide plate employed in a surface light source device which is applied to a liquid crystal display of a second embodiment in accordance with the present invention;

FIG. 11a is a plan view to illustrate a part around an incidence face of a light guide plate employed in a surface light source device which is applied to a liquid crystal display of a third embodiment in accordance with the present invention;

FIG. 11b is a cross section view along line A—A shown in FIG. 11a;

EMBODIMENTS

Figure 1:
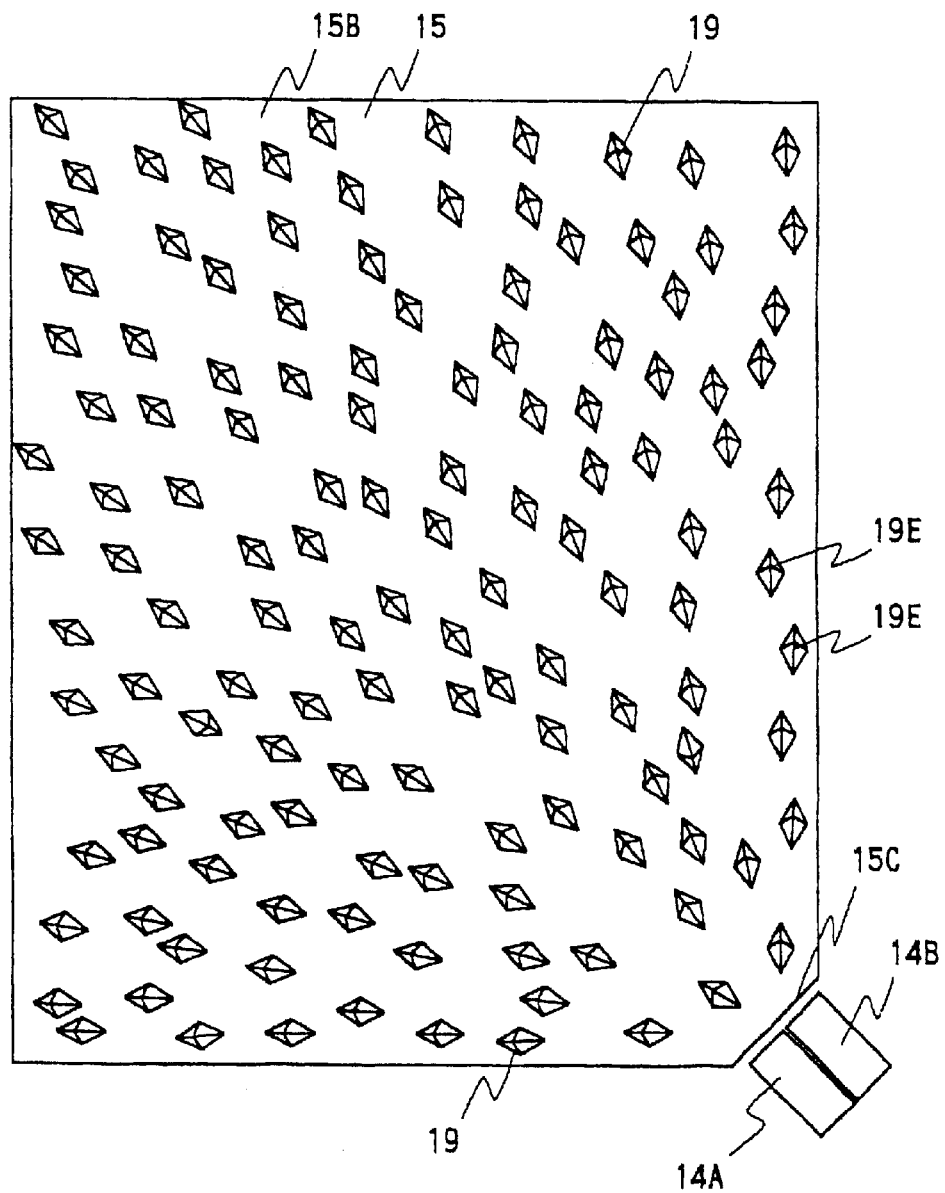
FIG. 1 is a plan view of a light guide plate employed in a surface light source device which is applied to a liquid crystal display of a first embodiment in accordance with the present invention.

Embodiments in accordance with the present invention are described hereafter with reference to the attached drawings. Note that factors such as size and shape of elements in the drawings are exaggerated as required for the sake of easy understanding. And further note that elements shown in two or more illustrations are referenced by the same reference symbols and repeated description on such elements is omitted as required.

First Embodiment

Figure 2:
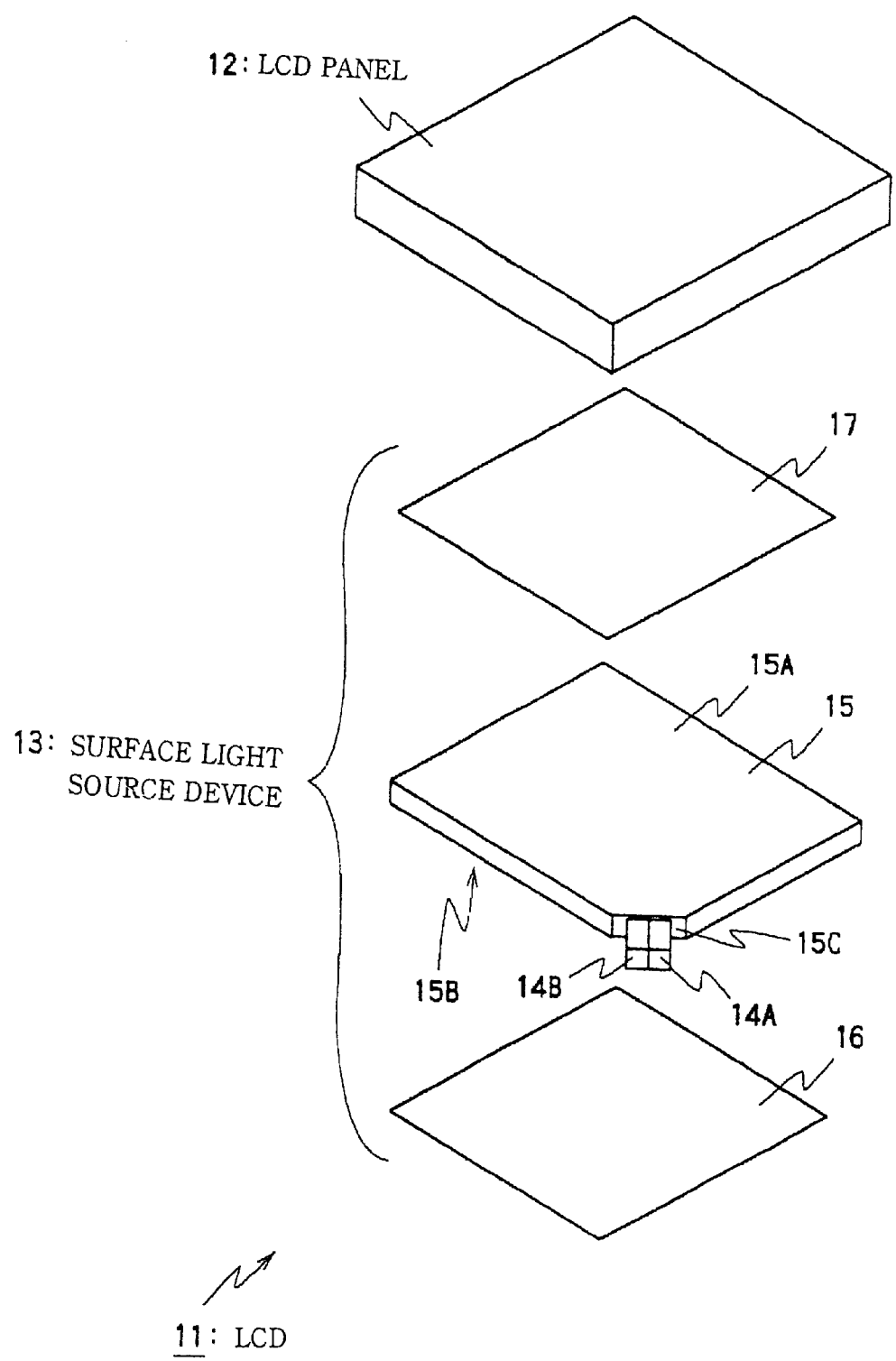
FIG. 2 is an exploded perspective view to illustrate an outlined construction of the liquid crystal display of the first embodiment in accordance with the present invention.

Referring to FIG. 2 in the first place, an outlined structure of a liquid crystal display (liquid crystal display) 11 of this embodiment is illustrated. Liquid crystal display 11 is incorporated, for example, in a portable phone and includes a surface light source device 13 for backlighting panel 12.

The surface light source device 13 comprises a light guide plate 15, LEDs (point-like light emitters) 14A and 14B, reflection sheet 16 and light diffusion sheet 17. The light guide plate 15 is a light permeable member formed of an acrylic resin (such as PMMA resin) or cycloolefinic resin, being provided with a generally uniform thickness. A major face of the light guide plate 15 provides an emission face 15A and the major face provides a back face 15B.

The light guide plate 15 has a generally rectangular shape at a corner portion of which an incidence face 15C is located. The incidence face 15C is provided by cutting-off at 45 degrees with respect to two sides meeting at the corner portion. And the incidence face 15C extends generally vertical to the emission face 15A and back face 15B.

The reflection sheet 16 made of, for example, a white PET, returns light leaked through the back face 15B into the light guide plate 15, thereby avoiding a loss of light. The light diffusion sheet 17 has an very weak light scattering ability, thereby preventing the micro-reflectors to be conspicuous. Such reflection sheet 16 and light diffusion sheet 17 are sheet members employed as required, respectively, one or both of them being omitted in some cases.

Referring to FIG. 1, the back face 15B of the light guide plate 15 is illustrated with the LEDs 14A and 14B. As understood from this illustration, the back face 15B is provided with a great number of micro-reflectors 19. Each micro-reflector 19 forms a projection which projects from a general plane representative of the back face (i.e. a plane provided by removing the micro-reflectors 19 imaginatively).

As shown in FIGS. 13A and 13B, each micro-reflector 19 has slopes 19A and 19B at a portion farther from the incidence face 15C. The slopes 19A and 19B meet to form a ridge 19E.

On the other hand, each micro-reflector 19 has slopes 19C and 19D at another portion nearer to the incidence face 15C. The slopes 19C and 19D meet to form a ridge 19F. And the slopes 19A and 19C, and 19B and 19D meet to form ridges, respectively. After all, in this embodiment, each micro-reflector forms a projection which is configurated like a quadrangle pyramid.

Thinking about this from a viewpoint of an inside light propagating within the light guide plate 15, it can be said that the micro-reflectors 19 form recesses inside. The recesses include valleys formed by the slopes 19A, 19B and valleys formed by the slopes 19C, 19D, respectively. The ridges 19E and 19F provide bottom lines of these valleys, respectively.

Each ridge line 19E, which provides a bottom line of a valley formed by the slopes 19A and 19B, approaches the back face (more strictly, a general plane representative of the back face, hereafter may be called simply "back face") with an increasing distance from the incidence face 15C.

Figure 3A:
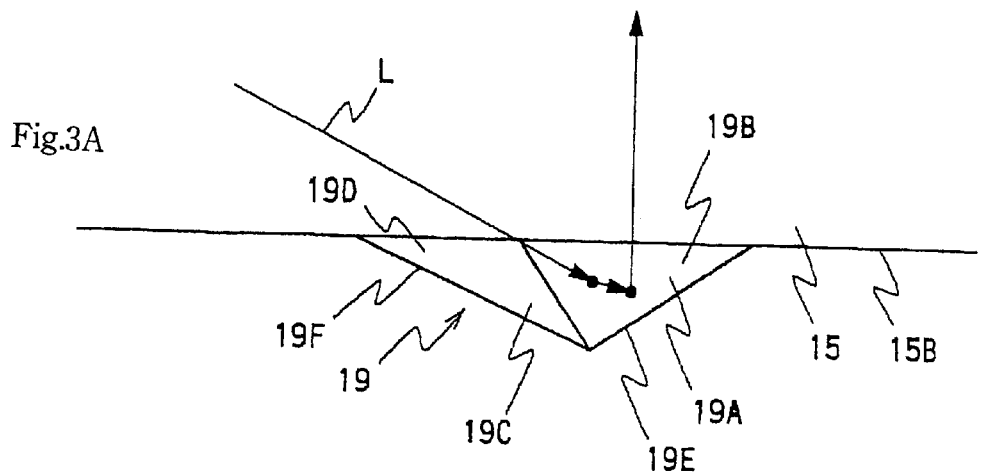
FIG. 3a is a side view of micro-reflector with which the light guide plate shown in FIG. 1 is provided.
Figure 3B:
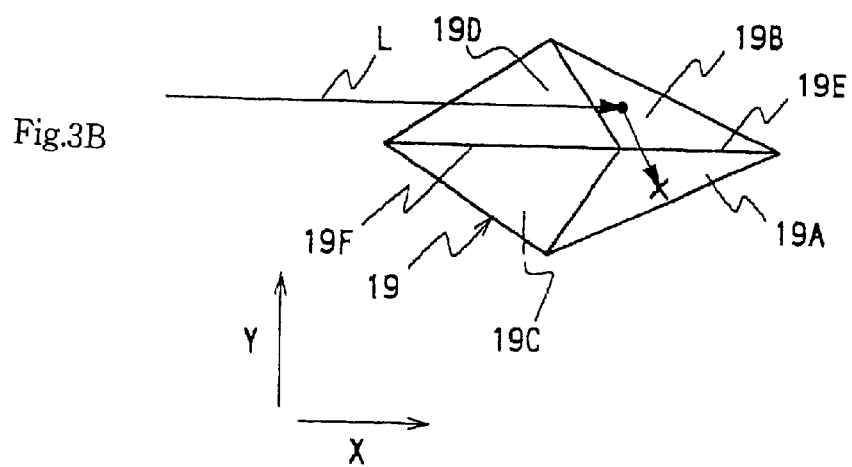
FIG. 3b is a plan view of micro-reflector with which the light guide plate shown in FIG. 1 is provided.

Light beam L shown in FIGS. 3A and 3B represents light that approaches a micro-reflector 19 from an incidence face 15C formed at the corner portion. Light beam L is supplied through the incidence face 15C regardless of being emitted from which of LEDs 14A and 14B, with the result that main approach paths extend from the corner portion to the micro-reflector 19.

However, it should be noted that some light reaches the micro-reflector 19 after undergoing inner reflections at the emission face 15A or the back face 15B. It is also noted that some light is directed to the slope 19A or 19B after undergoing inner reflections at the slope 19C or 19D.

Light that reaches any micro-reflector 19 enters into a recess provided by the micro-reflector 19 from a side relatively near to the corner portion, being impinging on either a slope 19A or 19B. After an inner reflection at one of the slopes 19A and 19B, an incidence to the other of the slopes 19A and 19B follows. After being inner-reflected, the light is directed to the emission face 15A.

An inner incidence angle to the emission face 15A is able to be controlled through adjusting directions of the slopes 19A and 19B. In the case of this embodiment, the directions of the slopes 19A and 19B are set so that the representative light beam L is vertically incident to the emission face 19A after being direction-converted. Therefore a main emission direction accords approximately with a frontal direction with respect to the emission face 15A. As a result, the liquid crystal display panel 12 is supplied with illumination light from an approximately vertical direction, providing a display screen which looks bright as viewed from the frontal direction.

A great attention should be paid to a an arrangement that the micro-reflectors 19B are orientated so that the valleys provided by the slopes 19A and 19B are opened toward the incidence face 15A. An orientation of a micro-reflector 19 can be represented by a ridge 19E. Accordingly each micro-reflector 19 has a ridge 19E directed to the incidence face 15C as simply illustrated in FIG. 1.

Since a great number of micro-reflectors 19 are orientated as above, light emitted from any of LEDs 14A and 14B is effectively direction-converted and directed to the emission face 15A under an approximately unchanged condition regardless of being emitted from which LED. This advantage is due to that both LEDs 14A and 14B are located at the corner portion.

If otherwise LEDs 14A and 14B are disposed at locations other than the corner as to be close to each other, LEDs 14A and 14B are required to emit light with an angular expansion about 180 degrees. To the contrary, an angular expansion of about 90 degrees is enough if a plurality of point-like emitters are disposed close to each other at the corner portion.

Preferably, each micro-reflector 19 has a size that is hardly visible through the emission face 15A. Number of micro-reflectors 19 distributed within a unit preferably tends to increase with an increasing distance from the incidence face 15A in order to uniformalize brightness on the emission face 15A.

To understand features of the embodiment in accordance with the present invention, some measurements were carried out and results are graphically illustrated in FIGS. 4 to 9.

Figure 4:
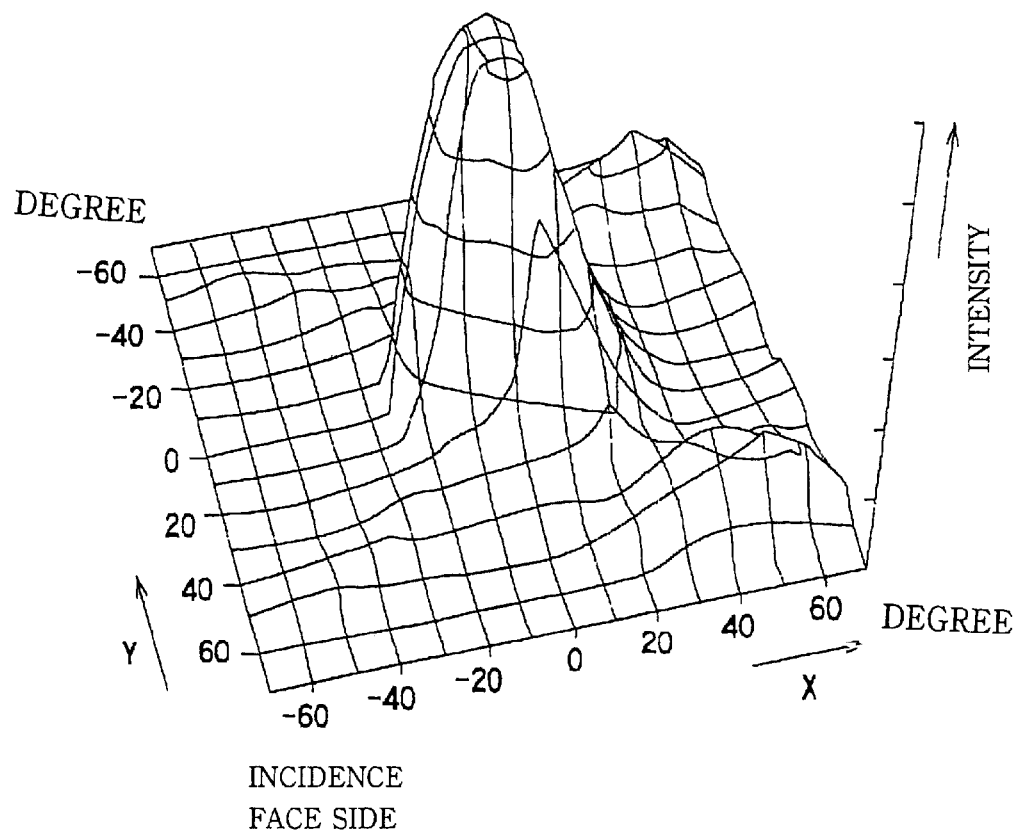
FIG. 4 is a graph showing a result of measurement to examine angular characteristics of an emission from an emission face of the light guide plate shown in FIG. 1 under a condition such that each ridge formed by inner reflection slopes is orientated in parallel with a light coming direction as viewed from just above each corresponding micro-reflector.
Figure 5:
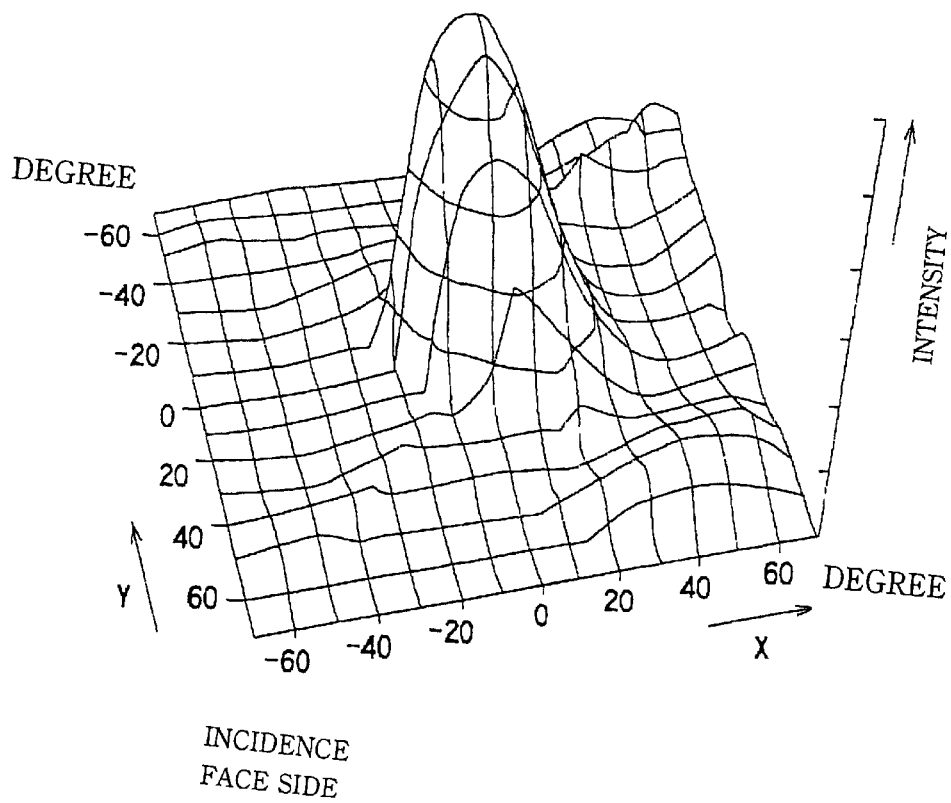
FIG. 5 is a graph showing a result of measurement to examine angular characteristics of an emission from the emission face without changing conditions as compared with those in the case of FIG. 4 except that the light coming direction in the case of FIG. 4 is replace by a different one which is deviated by plus 15 degrees with respect to the coming direction in the case of FIG. 4 (i.e. parallel with each ridge as viewed from just above each corresponding micro-reflector)

In the first place, FIG. 4 is a graph showing a result of measurement to examine angular characteristics of an emission from an emission face of the light guide plate 15 shown in FIG. 1 under a condition such that each ridge formed by inner reflection slopes 19E is orientated in parallel with a light coming direction as viewed from just above each corresponding micro-reflector 19, the condition according to the instant embodiment.

In contrast with this, FIGS. 5 through 9 are graphs showing results of measurement to examine angular characteristics of an emission from the emission face without changing conditions as compared with those in the case of FIG. 4 except that the light coming direction in the case of FIG. 4 is replace by different ones which are deviated by plus 15 degrees (FIG. 5), 30 degrees (FIG. 6), 45 degrees (FIG. 7), 60 degrees (FIG. 8) and 90 degrees (FIG. 9), respectively, with respect to the coming direction in the case of FIG. 4 (i.e. parallel with each ridge 19E as viewed from just above).

In each graph, X-axis corresponds to a light coming direction and Y-axis corresponds to a direction vertical to the light coming direction.

Actually, emission from around a center point of the emission face 15A was measured, and accordingly X-axis corresponds to a direction of a straight line bridging the point with the incidence face 15C.

In the case of FIG. 4, this direction accords with the direction of ridge 19E (projection on the back face 15B). In contrast with this, in the cases of FIGS. 5 through 9, X-axes are inclined by 15 degrees (FIG. 5), 30 degrees (FIG. 6), 45 degrees (FIG. 7), 60 degrees (FIG. 8) and 90 degrees (FIG. 9), respectively, with respect to the direction of ridge 19E (projection on the back face 15B).

It is noted that network-like curves in each graph has a rise which represents light intensity. The followings are understood from the graphs.

(1) In the case of FIG. 4, an observed emission has a high peak in a direction of X=about 0 degree and Y=about 0 degree, namely, in an approximately frontal direction of the emission face 15A.

(2) In the case of FIG. 4, the observed emission includes an emission with natural angular characteristics around X=Y=0 degree, namely, around the frontal direction of the emission face 15A. This tells that a practical viewing angle expansion is ensured around a roughly frontal direction of the liquid crystal display panel 12.

(3) On the other hand, in the cases of FIGS. 5 through 9, observed peaks are much lower as compared with the peak observed in the case of FIG. 4, respectively. And besides, angular positions of the observed peaks (principal emission directions) are greatly deviated from the frontal direction. Such phenomena tend to be striking with an increasing inclination of the extending direction of ridge 19E with respect to the light coming direction.

The above results vividly account how advantageous is an arrangement such that the micro-reflectors (ridges 19E) are orientated as to be corresponding to the light coming direction and the valleys are opened toward the light coming direction.

A great attention should be paid to an important fact that an incidence face located at a corner portion, in accordance with the present invention, to introduce light from a plurality of point-like emitters enables every micro-reflector 19 to realize the above-mentioned correspondence with ease for light supplied from every emitter.

Second Embodiment

Referring to FIG. 10, shown is a plan view illustrating a part around an incidence face of a light guide plate employed in a surface light source device which is applied to a liquid crystal display of the second embodiment in accordance with the present invention. It is noted that there is no difference between this embodiment and the first embodiment except the instantly employed light guide plate and LED arrangement.

As depicted, the employed light guide plate has a corner portion at which an incidence face is formed as to be composed of two sections. The sections have face-directions inclined toward plus and minus, respectively, with respect to the face-direction of the incidence face 15A which is employed in the first embodiment.

And one LED is disposed at each of the sections correspondingly. According to the above difference in face-direction, one of the directions (of light emitting) of the LEDs is determined so that projections of the ridges are inclined toward the plus side by an above-mentioned angle with respect to the light coming direction (satisfying the condition of FIG. 6) while the other of the directions (of light emitting) of the LEDs is determined so that projections of the ridges are inclined toward the minus side by an above-mentioned angle with respect to the light coming direction.

In other words, one LED is orientated as to rotated clockwise and the other LED is orientated as to rotated anticlockwise by the above-mentioned angle, respectively, with respect to the orientation of LEDs 14A, 14B in the first embodiment. This enables the instant embodiment to have characteristics expressing a relaxed directivity as compared with characteristics shown in FIG. 4 expressing a sharp directivity.

Figure 6:
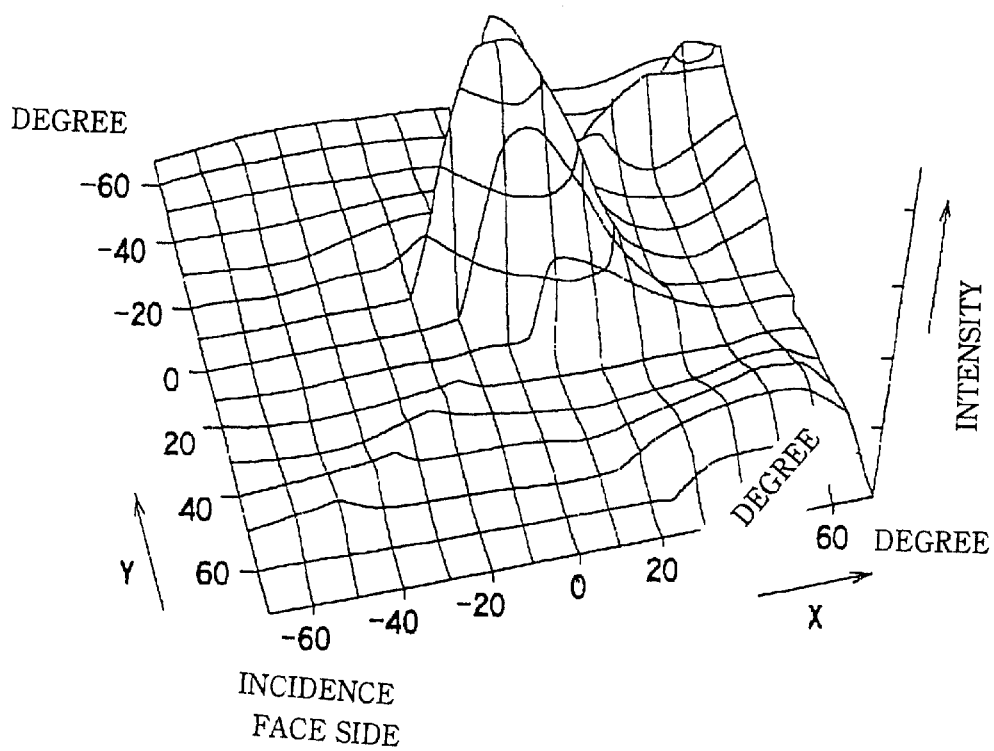
FIG. 6 is a graph showing a result of measurement to examine angular characteristics of an emission from the emission face without changing conditions as compared with those in the case of FIG. 4 except that the light coming direction in the case of FIG. 4 is replace by a different one which is deviated by plus 30 degrees with respect to the coming direction in the case of FIG. 4 (i.e. parallel with each ridge as viewed from just above each corresponding micro-reflector)
Figure 7:
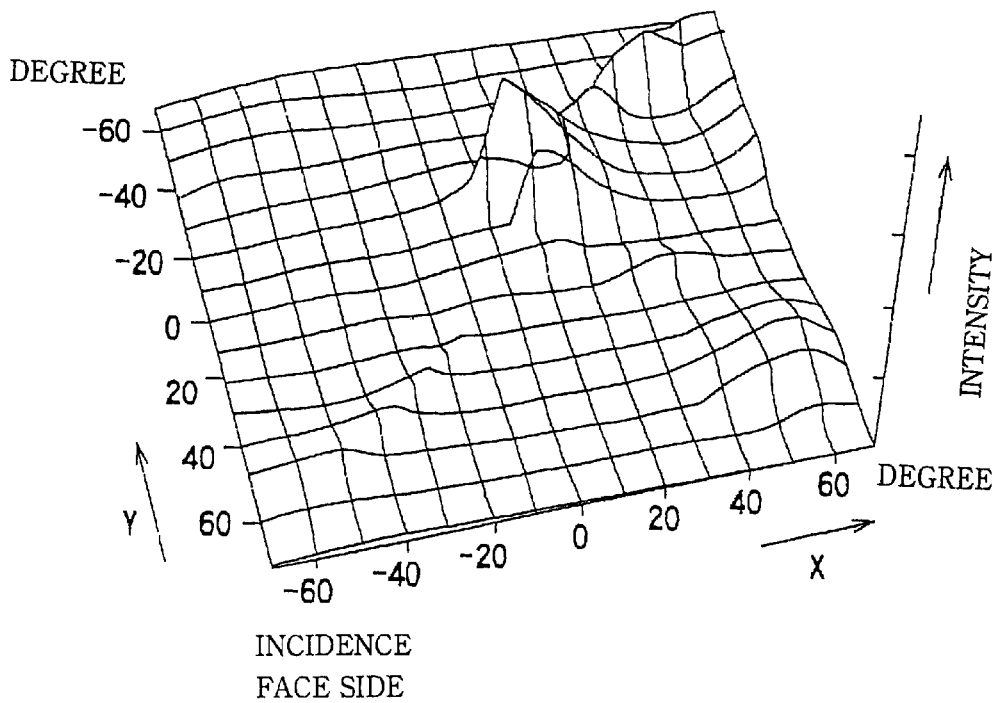
FIG. 7 is a graph showing a result of measurement to examine angular characteristics of an emission from the emission face without changing conditions as compared with those in the case of FIG. 4 except that the light coming direction in the case of FIG. 4 is replace by a different one which is deviated by plus 45 degrees with respect to the coming direction in the case of FIG. 4 (i.e. parallel with each ridge as viewed from just above each corresponding micro-reflector)
Figure 8:
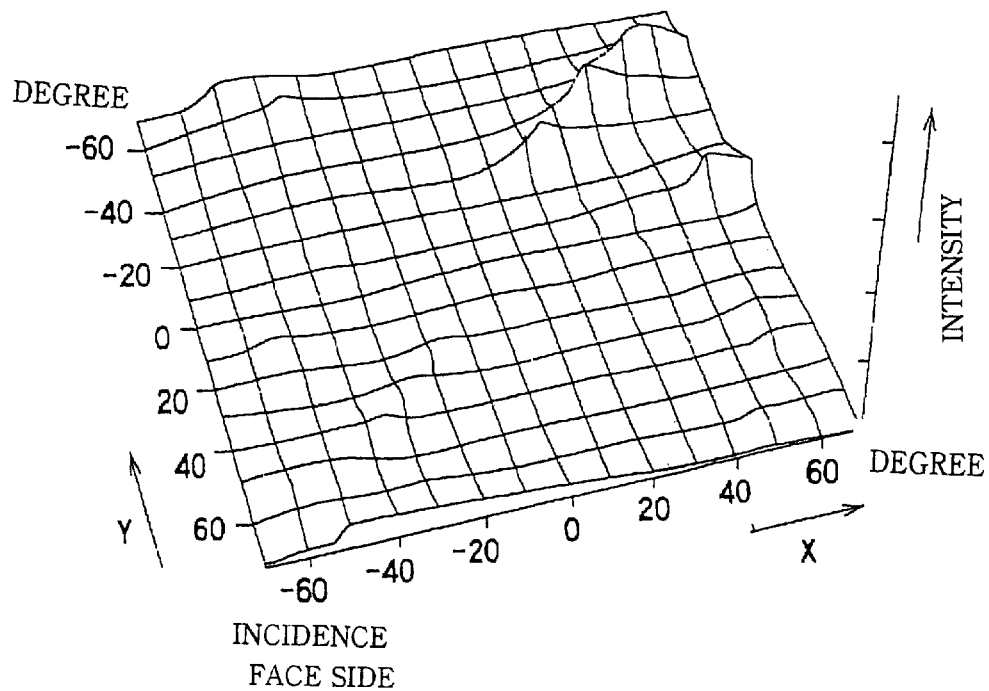
FIG. 8 is a graph showing a result of measurement to examine angular characteristics of an emission from the emission face without changing conditions as compared with those in the case of FIG. 4 except that the light coming direction in the case of FIG. 4 is replace by a different one which is deviated by plus 60 degrees with respect to the coming direction in the case of FIG. 4 (i.e. parallel with each ridge as viewed from just above each corresponding micro-reflector)
Figure 9:
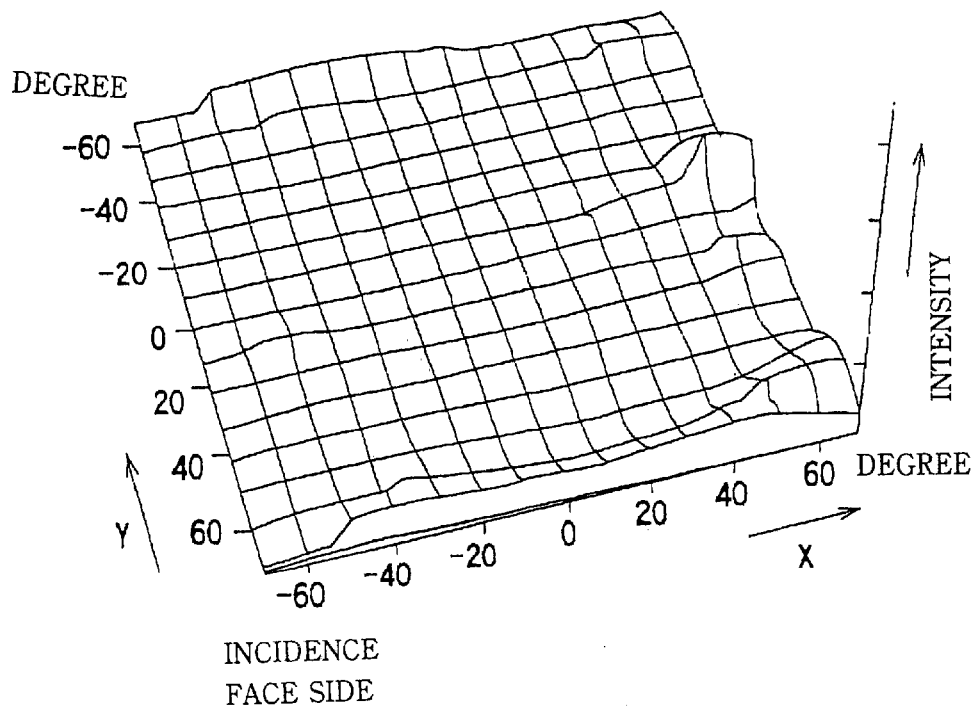
FIG. 9 is a graph showing a result of measurement to examine angular characteristics of an emission from the emission face without changing conditions as compared with those in the case of FIG. 4 except that the light coming direction in the case of FIG. 4 is replace by a different one which is deviated by plus 90 degrees with respect to the coming direction in the case of FIG. 4 (i.e. parallel with each ridge as viewed from just above each corresponding micro-reflector)

For example, when the above-mentioned angle is set at 30 degrees, resultantly obtained characteristics will be expressed by a characteristic curve that is obtained by adding a curve shown in FIG. 6 having a peak at Y=about −10 degrees to another curve, which is symmetric with the curve shown in FIG. 6, having a peak at Y=about +10 degrees and further by multiplying the plotting height expressing light intensity by ½. The characteristic curve will has a peak with a reduced sharpness, thereby providing a bright illumination in a comparatively wide angular range.

Third Embodiment

Referring to FIGS. 11A and 11B, shown are a plan view and cross section view respectively illustrating a part around an incidence face of a light guide plate employed in a surface light source device which is applied to a liquid crystal display of the third embodiment in accordance with the present invention. It is noted that there is no difference between this embodiment and the first embodiment except the instantly employed light guide plate and LED arrangement.

The instantly employed light guide plate has a corner portion having an obliquely cut-off configuration. That is, the corner portion includes a slope which is inclined with respect to an emission face and back face. An top edge of the slope meets the back face. Accordingly, the back face is larger than the emission face by an area corresponding to an objective area of the slope onto the back face. And, an incidence face is set in this objective area. A plurality of LEDs are disposed as to supply light to the incidence face.

Light supplied by each LED is introduced into the light guide plate through the incidence face and is inner-incident to the slope at the corner portion. This causes the light path to be bent to an extending direction of the light guide plate, with the result that the light pushes its path through the light guide plate. Behaviour of light after this is generally the same as that of the first embodiment.

That is, emission from the emission face occurs after an effective light direction conversion is achieved by many micro-reflectors formed on the back face. As to matters such as orientation of the micro-reflectors, the first embodiment is to be referred. It is noted that such a slope formed at a corner portion is sometimes called "light bending face".

Modifications

The above-described embodiments do not limit put the scope of the present invention at all. For example, the following modifications are allowed.

(a) Micro-reflectors may have a shape other than one like a quadrangle pyramid. Micro-reflectors are essentially enough if they have functions to receive light into their valleys formed corresponding to projections and to perform light direction conversion for producing light directed to an emission face. It should be noted that the micro-reflectors (projections) must be orientated as to satisfy the condition as defined in the claims.

(b) In the above-described embodiments, a pair of slopes of each micro-reflector are connected directly to each other. However, this puts no limitation on the present invention. For example, a pair of slopes may be connected to each other with a curved face interposed between them so far as a practically enough performance is realized. In this case, top lines or valley bottom lines formed by curved faces provide ridges.

(c) In the above-described embodiments, a pair of slopes of each micro-reflector are planes. However, this puts no limitation on the present invention. For example, a pair of slopes may be curved faces which are connected to each other to provide a projection so as a practically enough performance is realized. In this case, top lines or valley bottom lines formed by curved faces provide ridges.

(d) In the above-described embodiments, brightness (emission intensity) is uniformalized by adjusting number of micro-reflectors. But it is noted that means for uniformalizing brightness (emission intensity) does not relate to the present invention directly. Accordingly, for example, size or shape may be adjusted to realize a flattened brightness (emission intensity) distribution, instead of or in addition to adjusting number.

(e) In the second embodiment, LEDs are arranged as to be inclined inward and the incidence face is correspondingly formed as to be composed of two sections. However, an incidence face formed of a single face may be employed, with LEDs being arranged as to be inclined inward.

(f) In the second embodiment, LEDs are arranged obliquely inward so that their principal emitting directions (main beam paths 9 cross over within the light guide plate. Inversely, however, it is allowed that LEDs are arranged obliquely outward so that their main beam paths are divergent.

(g) In the third embodiment, the corner portion having a cut-off configuration to provide an incidence face. However, this puts no limitation on the present invention. For example, as shown in FIGS. 12 and 13, an incidence face is provided by a portion projected partially from a corner portion.

Figure 12:
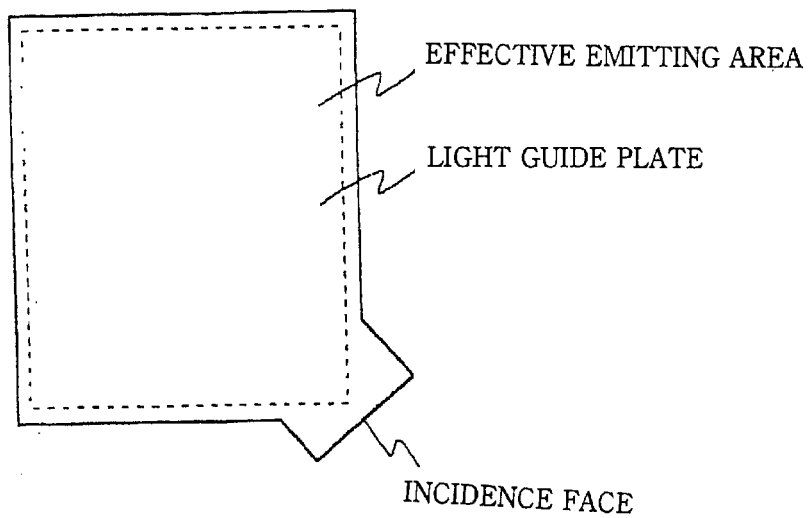
FIG. 12 is a plan view of a light guide plate of a modified embodiment in accordance with the present invention.
Figure 13:
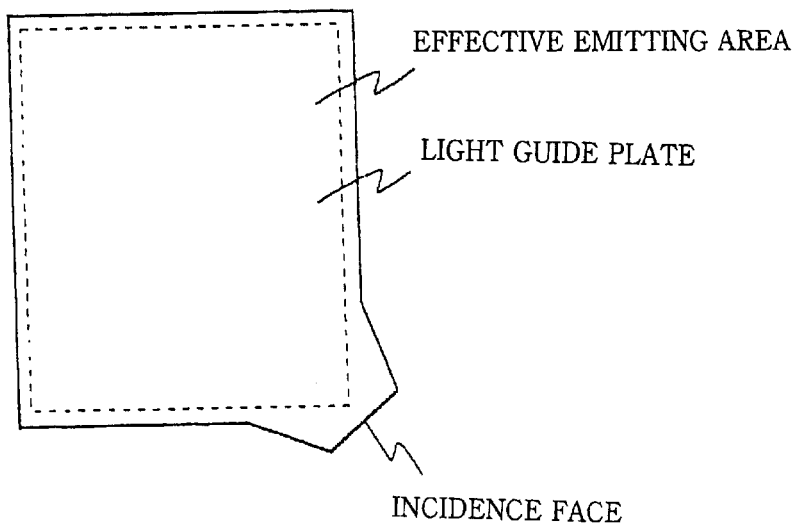
FIG. 13 is a plan view of a light guide plate of another modified embodiment in accordance with the present invention.
Figure 14:
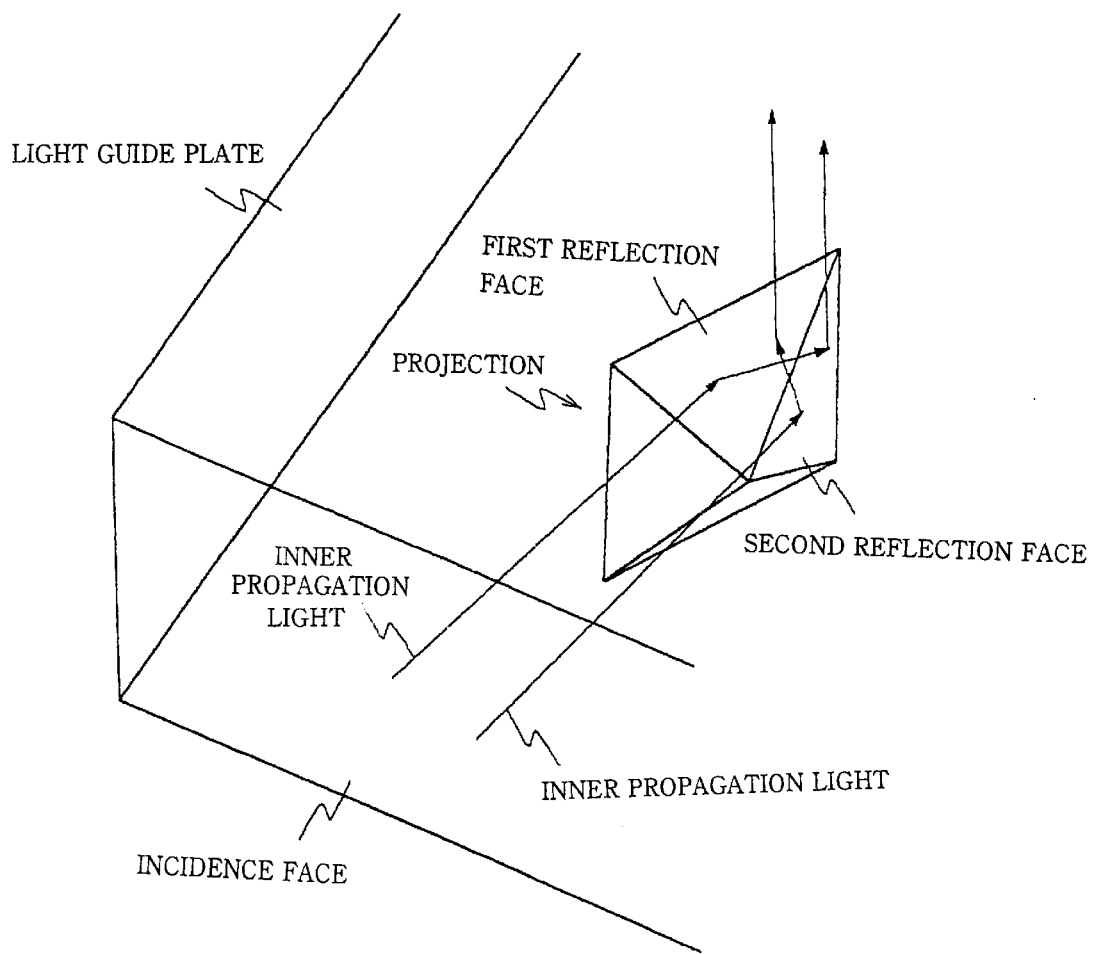
FIG. 14 is a perspective view to illustrate a projection on a light guide plate in the prior art.
Figure 15:
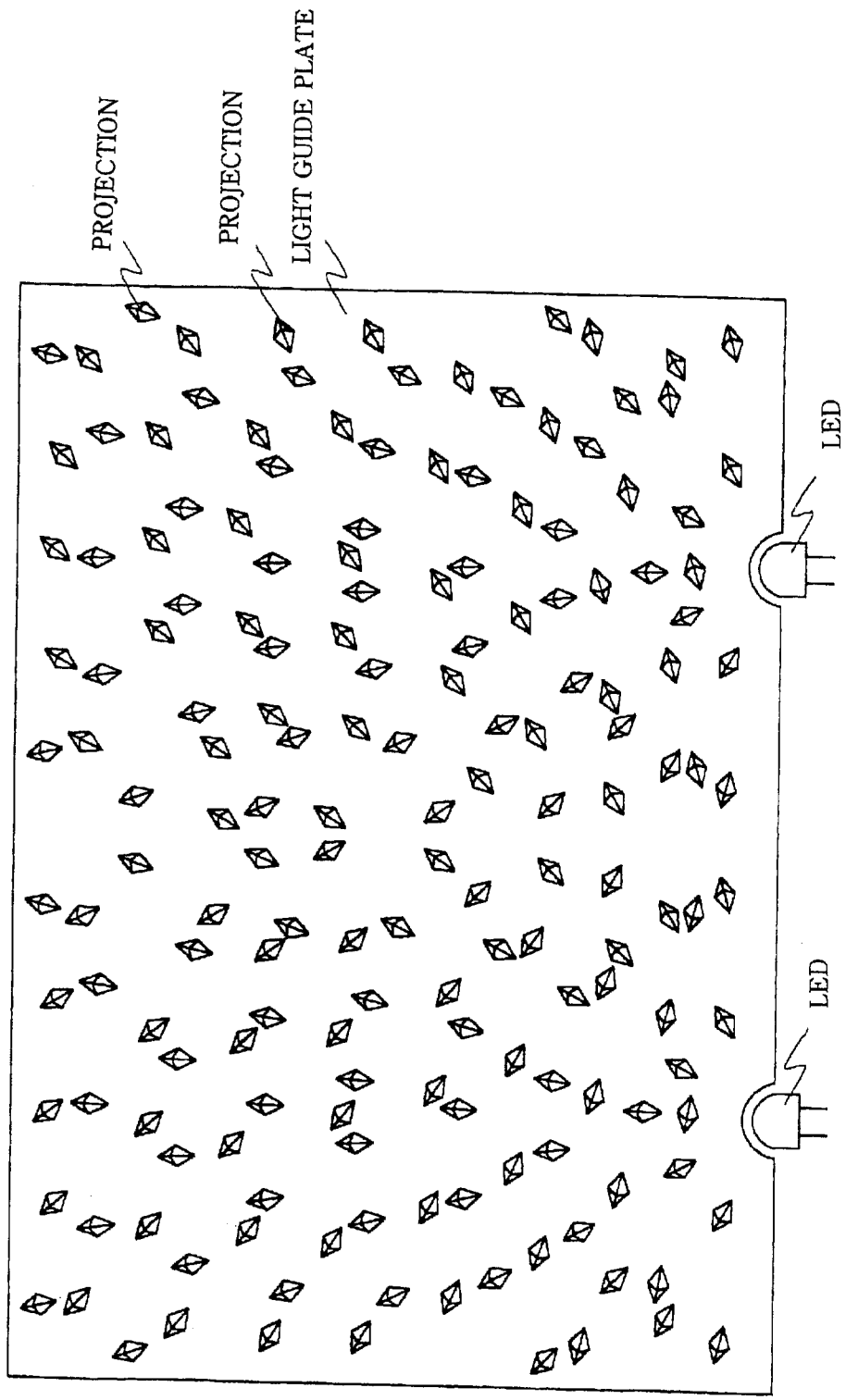
FIG. 15 is a plan view to illustrate a light guide plate having a back face which is provided with a great number of projections as shown in FIG. 14.

The case of FIG. 12 brings an advantage that an effective emitting area avoids from being reduced by cutting-off of the corner portion. And the case of FIG. 13 brings a more smooth light transfer through an incidence face located at a top of the projected portion into the light guide plate because the projected portion has a tapered side face.

(h) In the third embodiment, the incidence face is located on the back face at the corner portion. However, this puts no limitation on the present invention. That is, an incidence face may be located on the emission face at the corner. This arrangement is suitable for a so-called frontlighting-type liquid crystal display.

Further, the arrangement is also suitable for a backlighting-type liquid crystal display such that a wiring substrate is disposed at the liquid crystal display panel side on which LEDs are mounted.

(i) Although the above-described embodiments employ light guide plates each of which has a generally uniform thickness, this puts no limitation on the present invention. For example, it is allowed to employ a light guide plate having a wedge-like cross section and a thicker side corner at which an incidence face is formed.

(j) The above embodiments are described as they are applied to displays for portable phones. However, this puts no limitation, and the present invention may be applied to various appliances which require surface light source devices.

(k) In each of the above embodiments, two LEDs are disposed at a corner portion. It is, however, needless to say that three of more point-like emitters may be disposed. Further, they may emit light beams of different colors. For example, application to a color display LED is possible if three kinds of LEDs emitting red, green and blue light respectively are disposed.

What is claimed is:

1. A light guide plate to be supplied with light from a primary light source having a point-like light emitter, comprising:

an emission face for light output;

a back face opposite to said emission face; and an incidence face for light input, being located at a corner portion of said light guide plate;

said back face being provided with a great number of projections for light-advancing-direction-conversion;

each of said projections including a pair of slopes formed so as to provide a ridge approaching said back face with an increasing distance from said incidence face; and said pairs of slopes providing valleys in said light guide plate, the valleys being orientated to be opened toward said corner portion as to convert light approaching thereto from said corner portion into light advancing toward said emission face.

2. A light guide plate in accordance with claim 1, wherein said light guide plate is supplied with light from a primary light source having a plurality of point-like light emitters.

3. A light guide plate in accordance with claim 1, wherein said projections are configured like quadrangle pyramids.

4. A surface light source device comprising:

a primary light source having a point-like light emitter; and a light guide plate supplied with light from said primary light source, said light being introduced into said light guide plate through an incidence face and being emitted through an emission face, said light guide plate further having a back face opposite to said emission face, wherein said incidence face is located at a corner portion of said light guide plate so that light from said point-like light emitter is incident to said incidence face and said back face is provided with a great number of projections for light-advancing-direction-conversion, each of said projections including a pair of slopes formed so as to provide a ridge approaching said back face with an increasing distance from said incidence face, and said pairs of slopes providing valleys in said light guide plate, the valleys being orientated to be opened toward said corner portion as to convert light approaching thereto from said corner portion into light advancing toward said emission face.

5. A surface light source device in accordance with claim 4, wherein said primary light source has a plurality of point-like light emitters and light is supplied toward said incidence face from at least two point-like light emitters.

6. A surface light source device in accordance with claim 4, wherein said projections are configured like quadrangle pyramids.

7. A display including a surface light source device to illuminate a liquid crystal display panel, said surface light source device comprising:

a primary light source having a point-like light emitter; and a light guide plate supplied with light from said primary light source, said light being introduced into said light guide plate through an incidence face and being emitted through an emission face, said light guide plate further having a back face opposite to said emission face, wherein, said incidence face is located at a corner portion of said light guide plate so that light from said point-like light emitter is incident to said incidence face and said back face is provided with a great number of projections for light-advancing-direction-conversion, each of said projections including a pair of slopes formed so as to provide a ridge approaching said back face with an increasing distance from said incidence face, and said pairs of slopes providing valleys in said light guide plate, the valleys being orientated to be opened toward said corner portion as to convert light approaching thereto from said corner portion into light advancing toward said emission face.

8. A display in accordance with claim 7, wherein said primary light source has a plurality of point-like light emitters and light is supplied toward said incidence face from at least two point-like light emitters.

9. A display in accordance with claim 7, wherein said projections are configured like quadrangle pyramids.

* * * * *